US006979359B2

(12) United States Patent
Laiti

(10) Patent No.: US 6,979,359 B2
(45) Date of Patent: Dec. 27, 2005

(54) PORTABLE FILTER UNIT AND METHODS FOR USING SAME

(76) Inventor: Peter J. Laiti, 6165 Pohick Station Dr., Fairfax Station, VA (US) 22039

( * ) Notice: Subject to any disclaimer, the term of this patent is extended or adjusted under 35 U.S.C. 154(b) by 57 days.

(21) Appl. No.: 10/619,448

(22) Filed: Jul. 16, 2003

(65) Prior Publication Data

US 2005/0011356 A1    Jan. 20, 2005

(51) Int. Cl.[7] .............................................. B01D 46/00
(52) U.S. Cl. .................. 55/356; 55/385.2; 55/471; 55/472; 55/473; 55/467; 55/485; 55/486; 55/350.1; 55/DIG. 18; 95/287; 95/288; 454/187
(58) Field of Search ................................ 55/385.2, 356, 55/471–473, DIG. 18, 467, 485, 486, 350.1; 95/287, 288; 454/187

(56) References Cited

U.S. PATENT DOCUMENTS

| | | | |
|---|---|---|---|
| 3,951,628 A | | 4/1976 | Eskijian |
| 4,968,333 A | * | 11/1990 | Ellis et al. ................. 55/341.1 |
| 5,069,691 A | * | 12/1991 | Travis et al. .................... 96/57 |
| 5,295,855 A | | 3/1994 | Walz |
| 5,417,729 A | * | 5/1995 | Greenleaf, Sr. ............. 55/350.1 |
| 5,433,763 A | * | 7/1995 | Shagott et al. ................. 55/323 |
| 5,853,441 A | * | 12/1998 | Groen et al. ............... 55/350.1 |
| 6,022,389 A | * | 2/2000 | Vross et al. ................. 55/315.1 |
| 6,328,775 B1 | * | 12/2001 | Fuchs ......................... 55/385.2 |
| 6,372,052 B1 | | 4/2002 | Jones |
| 6,383,241 B1 | * | 5/2002 | Janus et al. ................. 55/385.2 |
| 6,402,613 B1 | * | 6/2002 | Teagle ......................... 454/195 |
| 6,607,573 B1 | * | 8/2003 | Chaurushia et al. .......... 55/356 |
| 6,616,720 B1 | * | 9/2003 | Smith ......................... 55/385.2 |
| 2003/0150327 A1 | * | 8/2003 | Bolden ......................... 995/273 |

OTHER PUBLICATIONS

"Safeguarding America's HVAC Systems Against Chemical Warfare Threats," Filtration News, Jul./Aug. 2002, pp. 22, 24, 26, vol. 20, No. 4.
Nuclear Air Cleaning Handbook, Jun. 28, 2002, pp. 215-224, DOE-HDBK-XXXX-2002, Chapter 6, Sections 6.5-6.6, U.S. Dept. Of Energy, United States of America.

* cited by examiner

Primary Examiner—Duane Smith
Assistant Examiner—Minh-Chau T. Pham
(74) Attorney, Agent, or Firm—Fitch Even Tabin & Flannery

(57) ABSTRACT

Portable, rapidly deployable filter unit for use in air filtering methods providing high efficiency filtration of airborne toxins. The filter unit includes a fan section and a filter section that are releasably attachable at their respective lateral ends permitting the filter unit to be reconfigurable to properly handle a variety of threat scenarios involving protecting the occupant(s) and equipment in an enclosure against an airborne release of toxic chemical, biological, or radiological agents that threaten to contaminate the air supply, or, alternatively, for decontaminating the air of an isolation room occupied by contaminated or contagiously ill persons or materials and protecting the occupants or equipment located outside the isolation room.

23 Claims, 12 Drawing Sheets

PORTABLE FILTER UNIT AND METHODS FOR USING SAME

TECHNICAL FIELD

The present invention relates generally to a portable, rapidly deployable filter unit for use in air filtering methods providing high efficiency filtration of airborne toxins. More particularly, it relates to a filter unit including fan section and a filter section that are releasable and attachable at their respective lateral ends permitting the filter unit to be reconfigurable to properly handle a variety of threat scenarios involving protecting the occupant(s) or equipment in an enclosure against external airborne release of toxic chemical, biological, or radiological agents that threaten to contaminate the air supply (a positive air pressure situation), or, alternatively, for decontaminating the air of an isolation room occupied by toxically contaminated or contagiously ill persons (a negative air pressure situation). In either scenario the filter unit will/can be located in a contaminated or non-contaminated area. The location of the filter unit will dictate whether or not it is configured in a draw-through or blow-through arrangement for any situation. Proper configuration is critical to ensure that the contaminants do not enter the safe positive pressure area or escape from a contaminated negative pressure area.

BACKGROUND OF THE INVENTION

There is an ever-increasing need for air filtering systems that can be rapidly deployed to protect an enclosure against noxious airborne agents released in the vicinity of the enclosure. Every year there are numerous incidents of noxious fumes entering buildings and causing illness and disruptions due to accidents, deliberate attacks or malicious pranks.

There currently is heightened concern about super-toxic airborne agents being released as part of a chemical, biological or radiological ("CBR") attack launched by terrorists in or near a metropolitan area, a residential area, office complex, governmental buildings, medical facilities, or other public or private buildings or areas. In addition, military personnel in combat areas may need protection from releases of airborne CBR agents in the vicinity of a tent or other enclosure area where the troops are bivouacked or have set up a field command or field hospital, and so forth.

There is a need and demand for portable filter units capable of protecting a room airspace or other enclosure airspace against nuclear, biological, and chemical agent attacks that occur outside the enclosure, as well as capturing any internal contamination within a negative pressure area prior to release to the outside air. In this regard, easily portable CBR filter units are needed that can be conveniently handled, transported, and rapidly deployed into service without requiring time-consuming or complicated installation steps or infrastructure or support. CBR filter units can be expected to be potentially deployed in a wide variety of different CBR threat scenarios requiring a highly versatile unit.

Portable air cleaning units for use in the nuclear industry have been described that have a fan assembly that is integrally connected always on the downstream side of a filter assembly, such that the air cleaning unit is structurally designed and capable of only being operated in an air draw-through mode relative to the filter assembly. A filter unit of that type is described in the Nuclear Air Cleaning Handbook, DOE-HDBK-XXXX-2002, U.S. Dept. of Energy, Chapter 6, Jun. 28, 2002 ("Draft"), pp. 216–220. That filter configuration, however, would have serious drawbacks if implemented as a general airspace cleaner used to clean and pressurize an enclosure when this unit is located in the contaminated area. Although not recognized or address in the prior art, in that general airspace cleaning scenario, air leakage or infiltration would occur, or would be at high risk of occurring, in the intervening air passage or at the associated air seals that structurally must be made between the filtering and fan assemblies or around filter service doors panels that are required of such a filter unit. Air infiltration into that filter unit could occur when the fan assembly is being used to draw or pull air through the filter unit due to contaminated air present in the surrounding airspace bypassing the filter assembly by infiltrating through the air sealed connection or duct between the filter and fan assemblies. In this manner, contaminated unfiltered air can get sucked into and combine with the filtered air stream. In that undesired infiltration situation, the actual or potential problem is that filtered air can become recontaminated by the contaminated infiltrating air before it is discharged from the filter unit. The prior art does not mention or address this application or problems arising therein. If an attempt were made to design the leakage or infiltration problem away, i.e., attempt to manufacture a bona fide completely air-tight filter unit enclosure, that generally would be too costly for filter units intended for wide market distribution including private consumers.

The present invention recognizes, addresses and solves the above-mentioned needs and problems relative to portable CBR filter systems.

SUMMARY OF THE INVENTION

The present invention relates to a portable filter unit having a fan section and a filter section, each mounted on their own respective movable carts, in which the fan section and filter section are adapted for attachable/detachable interconnection with each other at either of their respective lateral ends. This permits provision of either blow through or draw through of air through the filter section of the filter unit such that the fan section can be positioned on an air flow side of the filter section appropriate for a given threat scenario insofar. Namely, the fan section can be located upstream or downstream of the filter section effective to as prevent the spread of contamination between outside and inside environments otherwise possible due to contaminated air leaking into or infiltrating into the fan section and being passed unfiltered into clean air space or outside environment.

The capability to rapidly reconfigure the filter and fan sections of the filter unit of the present invention makes it possible to operate the filter unit under a wide variety of CBR or other toxic/bacterial/viral contamination scenarios while making the unit tolerant of air leakage from or infiltration into the filter unit and without the need to try to incorporate highly elaborate or expensive air sealing measures on the multi-sectioned filter unit to combat the leakage/infiltration problem.

The portable filter unit of the present invention can be used to remove chemical war gases and agents from air, including, for example, blister agents (e.g., mustards); nerve agents (e.g., sarin, VX); choking agents (e.g., phosgene); blood agents (e.g., cyanogen chloride); anthrax; bacterial agents (e.g., anthrax); viral or pathogenic agents (e.g., smallpox, plague, botullinum); as well as industrial pollutants or other toxic agent threats released by accident or act of terrorism.

BRIEF DESCRIPTION OF THE DRAWINGS

The present invention is illustrated by way of example and not limitation in the accompanying figures, in which like references indicate similar elements, and in which.

DETAILED DESCRIPTION OF THE PREFERRED EMBODIMENTS

The present invention provides a filter unit adapted to permit reconfiguration of separate, releasably attachable filter and fan sections thereof to accommodate numerous different contamination scenarios, such that any leakage of contaminated air from the filter unit or infiltration of outside contaminated air into the fan section or fluid passage established between the attached filter and fan sections that passes unfiltered into an environment creates no increased risk of CBR exposure to persons inside and outside the enclosure.

The sequence of the respective filter and fan sections of the portable filter unit can be readily changed using integral quick-release releasable fasteners so that the filter unit can be operated in air pull through-or air blow through modes as appropriate to avoid contamination problems in a wide variety of implementation scenarios. The filter unit of the present invention is particularly applicable to filtering chemical, biological and radiological warfare agents and toxic industrial chemicals and materials. The present invention also relates to methods of using the filter units and the systems of use thereof.

With the heightened risks of such chemical, biological, and radiological ("CBR") attacks facing the United States following recent domestic attacks there is a great desire to provide a means to assist in protecting rooms in buildings from ultra-toxic gas or pathogenic particulate threats associated with CBR attacks here in the United States of America, and elsewhere. In addition, military personnel in combat zones where CBR agent attacks are possible may need protection from airborne releases of CBR agents in the vicinity of a tent or other mobile enclosure where the troops are bivouacked or have set up a field command or field hospital, and so forth. The filter unit of the present invention is equipped and versatile enough to handle all these scenarios.

Figure 1:
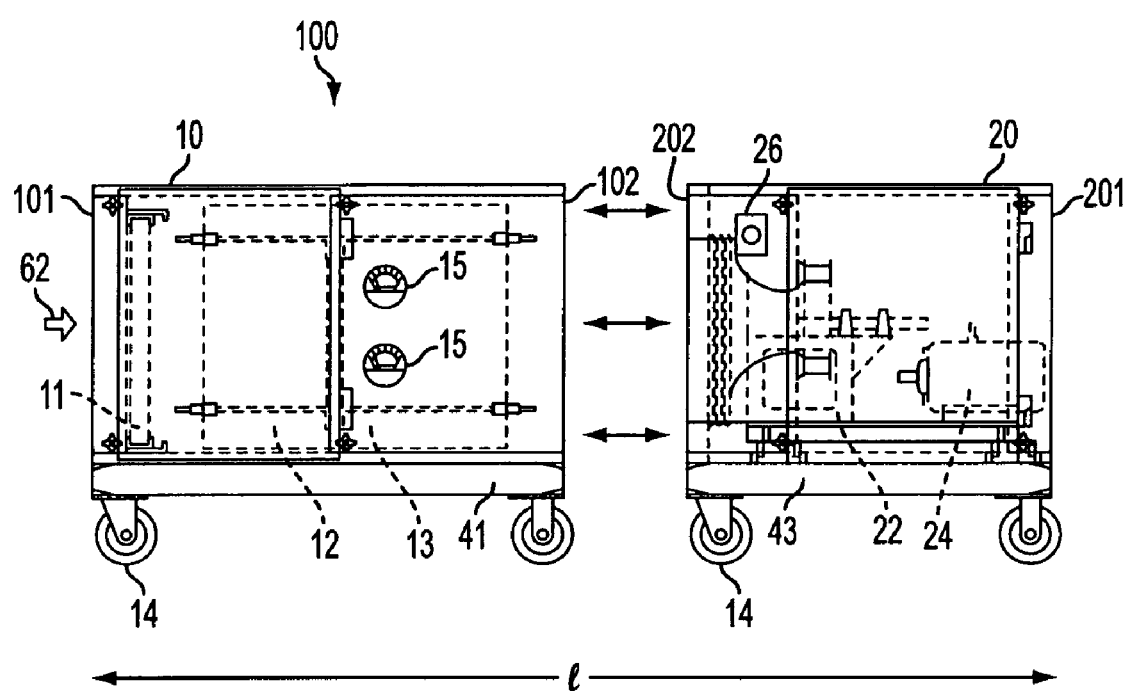
FIG. 1 is a schematic side view of a portable filter unit according to an embodiment of the present invention.

Referring to FIG. 1, a filter unit 100 according to a representative, non-limiting embodiment of the present invention is illustrated in schematic form. In a preferred embodiment, the filter unit 100 is a multi-sectioned device that is rapidly deployable as a single unitary packaged unit. It includes a pre-filter 11 to remove large particles that may prematurely load the HEPA filter 12 that removes biological and radiological contaminants and a high efficiency gas adsorber filter 13 that removes chemical and radiological gases 13 in one section 10 and a motor driven fan 22 in a separate fan section 12, with the capability of reconfiguring the sequence of the sections 10 and 20 such that the airflow either passes through the fan section 20 or the filter section 10 first before passing through the other remaining section, depending on the event in which the filter unit 100 is deployed to prevent releases of contaminates by the filter unit 100 that are harmful or potentially harmful to persons located inside or outside the enclosure. The filter unit 100 can be transported as a single unit to a location where it is desired to deploy it. The CBR filtering section 10 of filter unit 100 is applied to an air stream 62 drawn (pulled) or blown (forced) through the filter section 10 of the filter unit 10. For purposes herein, a "section" means a unitary module or subassembly.

Each of the filter section 10 and fan section 20 is mounted on a cart 41, 43, respectively, or a similar carriage frame, having rolling means 14 provided on its lower side in contact with flooring or other support surface. The rolling means 14 may be caster wheels, rollers, glides, ball bearings, and so forth, provided in a sufficient number and locations such that the cart remains stably supported and movable. For example, a caster wheel adapted to swivel can be provided at each corner of the underside of the cart of each section. The carts 41 ad 43 optionally can have upraised handles, or a tow handle, at one or both lateral ends to assist movement of the filter unit. Also, a brake mechanism or other locking means optionally can be included on at least one set of the caster wheels on one of the carts to help keep the filter unit stationary once positioned to be put into service.

The on board fan motor 24 is an electric motor. Preferably, it is an electric motor powered by connection of a power cord into a utility power source or generator, or powered by battery, which can be included on board the fan section 20. An electric switch will be provided on the fan section to turn the fan off and on. The fan section 20 also usually includes a fan inlet screen 17 for safety reasons. A centrifugal pressure blower, for example, can be used in fan section 20 as the air moving means. A non-limiting commercial example of such a centrifugal blower is an EBM R3G250/EC-2 blower. The fan also could a wheel plenum fan. A non-limiting commercial example of that type of fan is a NYBL 121 50% wheel plenum fan. The wheel plenum fan can be driven, for example, by a 1.5 HP, one phase, 120–208V electric motor.

In one embodiment, the filter section 10 includes a prefilter 11, a HEPA filter, 12 and a gas-adsorbent activated carbon filter 13, in that sequence. The contaminated air is conducted through the filter section 10 is conducted first through the prefilter 11, then the HEPA filter 12, and lastly through the adsorbent carbon filter 13 before exiting the filter section 10. Therefore, a lateral end 101 of the filter section 10 nearest the prefilter 11, i.e., furthest from the adsorbent carbon filter 13, is the lateral end of the filter unit 10 that should be impinged first by a contaminated or potentially contaminated air stream 62 that will be treated by the filter section 10.

The fan section 20 will have opposite lateral end faces 201 and 202, either one of which can be mated and latched to either of the lateral ends 101 and 102 of the filter section 10 to form close to an air tight seal around the perimeter of the air conducting space. The lateral direction is indicated in FIG. 1 as direction l. Differential pressure gauges 15 can be included to monitor loading on one or more of the particle filters 11 and 12. Individual gauges for each stage of filtration can be used or a single gauge can be used to monitor more than one filtration stage.

Figure 2:
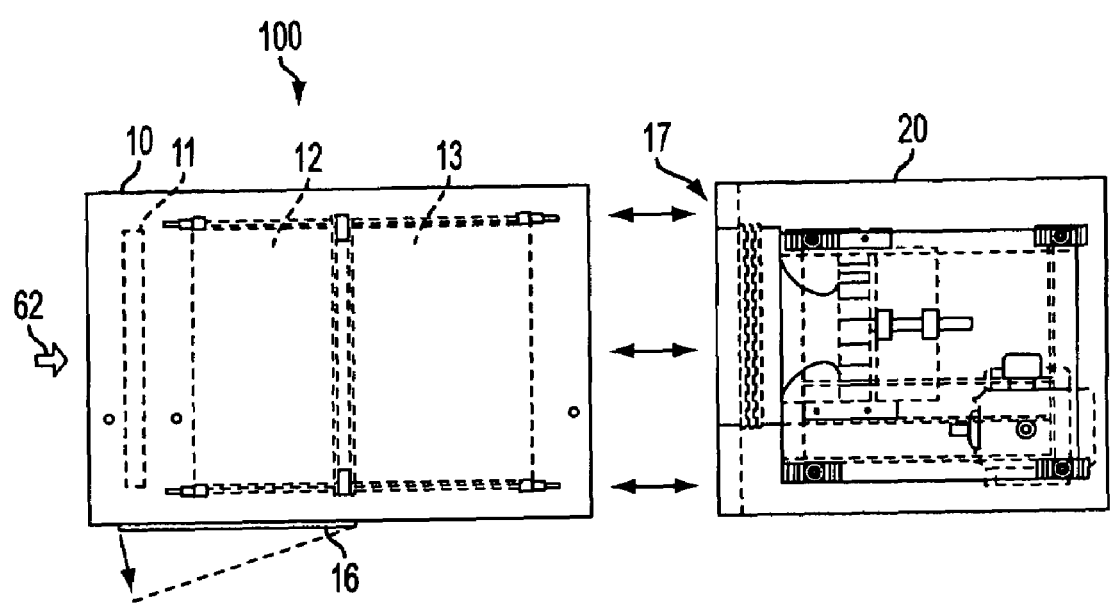
FIG. 2 is a schematic plan view of a portable filter unit of FIG. 1 according to an embodiment of the present invention.

As best seen in FIG. 2, access to the various filters in filter section 10 is provided via an access door 16 or doors. The access door can be hinged as indicated to swing out, or it can be removable and reattachable, such as by using threaded bolts or screw connectors to the frame of the section. The door 16 preferably should have a continuous neoprene gasket (not shown) fitted on its perimeter to create an air seal with the frame. The door 16 also can be adapted to have positive pressure adjustable latches including graspable knobs. Tracks used for the prefilter 11 can include a pile gasket to help seal the prefilter to its track. It is desirable to minimize the amount of air bypassing the prefilter 11. The HEPA filter 12 and adsorbent carbon filter 13 can be sealingly retained in place in respective filter sealing frames or other commonly used or useful filter retention means, for example, using spring-loaded swing-arm assemblies to induce positive sealing of the filter to the mounting surface of the filter sealing frame.

The filters 11, 12 and 13 used in filter section 10 should be selected and arranged in proper sequence to properly function as intended. The prefilter 11, which can be a standard dust filter, such as a 30% pleated filter, serves to remove macroscopic debris and particles before they reach the HEPA filter 12, effective to prevent the macroscopic particles or debris carried by the air stream from masking the higher efficiency HEPA filter. The HEPA filter 12 is used to remove very small particles, and preferably is rated effective to remove at least 99.99% of all particles. The adsorbent (impregnated activated) carbon filter 13 removes gases and should have a rating of at least 99.99% removal of DMMP as determined by a test described herein.

In one non-limiting embodiment, the CBR agent filter 13 deployed in the filter section 10 can be a pleated absorbent filter medium containing a specific grade of activated carbon and with the particles of absorbent packed as to limit significant axial dispersion of the adsorption wave moving through the filter medium. The activated carbon is preferably activated carbon impregnated with Copper-Silver-Zinc-Molybdenum-Triethylenediamine (ASZM-TEDA) grade, which is specifically optimized for use in chemical warfare applications. It can be purchased, for example, from Calgon, Inc. (Pittsburgh, Pa.). Otherwise, the activated carbon used may be virgin coconut shell activated carbon, which is effective in adsorbing many war gases other than certain high volatility war gases such as hydrogen cyanide, and the like. ASZM-TEDA carbon is manufactured in a rectangular-shaped mesh and then the carbon is incorporated into the medium, and the resulting composite can be pleated and used in a filter pack.

It will be appreciated that any CBR filter grade module design can be used for filter 13 that are or can be conveniently packaged to fit into the filter section 10 and that meet the gas filtering performance requirements described herein. In one embodiment, each CBR filter 13 is tested and packaged in accordance with applicable sections IEST-CC-RP-008-84. For quality control, it is further preferred that each production lot of adsorbent filters has been subjected to random selection of at least 10% of the filter lot or a minimum of two filters from the lot that is/are independently tested (i.e., "destructively challenged") to determine if the filter unit is at least >99.99% efficient in filtering out DMMP introduced at the intake side of the filter unit at a minimum of 5000 mg/m$^3$ dimethylmethylphosphonate (DMMP), for at least 20 minutes when challenging two 24 inch×24 inch×16 inch filters in series with an approach velocity of 350 FPM. Samples of filtered air that had passed through the filter unit are analyzed intermittently by any suitable analysis technique known in the industry for measuring DMMP levels in air. The basic protocol of a suitable version of this test is described in Filtration News, vol. 20, No. 4, pp. 22–26. 2002, which testing protocol descriptions are incorporated herein by reference.

In a preferred embodiment, failure of one randomly selected filter unit to include a minimum of two filters in a production lot fails the entire lot. DMMP is a chemical agent similar in composition to Sarin and it is currently used by the US Army to measure ultra-high efficiency carbon adsorber life. In addition, the filters 11, 12 and 13 should not individually or collectively create a large pressure drop in the air stream, and preferably cause a pressure drop in the air stream being filtered of no more than 3.0 inch water gauge (iwg) at 350 feet per minute (FPM) approach velocity. The filters in the filter section should initially meet this criterion when first used, and filters should be replaced with fresh filters if and when the pressure drop is observed to increase outside such levels after a period of usage. Filters must be disposed of as hazardous materials if used after an event in which toxic substances were released.

In one non-limiting embodiment supporting 1400 CFM of air filtration by the inventive air filter unit, the nominal size of the prefilter 11 is 24×24×2 inches, the nominal size of the HEPA filter 12 is 24×24×12 inches, and the nominal size of the activated carbon filter 13 is 24×24×16 inches. The HEPA filter and activated carbon filter each can involve a pleated composite sheet material. In another non-limiting embodiment supporting 600 CFM of air filtration by the inventive air filter unit, the nominal size of the prefilter is 16×16×2 inches, the nominal size of the HEPA filter is 16×16×12 inches, and the nominal size of the activated carbon filter is 16×16×16 inches. The dimensions of the various filters can vary depending on the capacity requirements associated with the particular "safe room" to be protected. The frames of the respective cart sections are sized to accommodate the filter sizes.

Although not limited thereto, the portable filter unit illustrated in FIGS. 1–2 may be dimensioned, for example, to support about 600–1400 CFM airflow capacity in which the fan section 20 can be about 24–34 inches in lateral length and the filter section 10 can be about 40–50 inches in lateral length, with each section having a height of about 20–30 inches. The filter and fan sections 10 and 20 can be constructed primarily of lightweight metal, composite plastic or plastic construction. For example, sections can be made with aluminum construction, such as 80 gauge aluminum construction, including a frame having internal extruded aluminum filter tracks with woven nylon pile seals or the like to receive the various filters. The filters can be sealed against door 16 providing access to the filter tracks and filters with two-pound density urethane foam mounted inside the door. Metal to metal components can be sealed with silicone compounds. The doors on the filter section and the fan section can be fitted with knurl knob bolt-down latches with uni-hinges.

Figure 3:
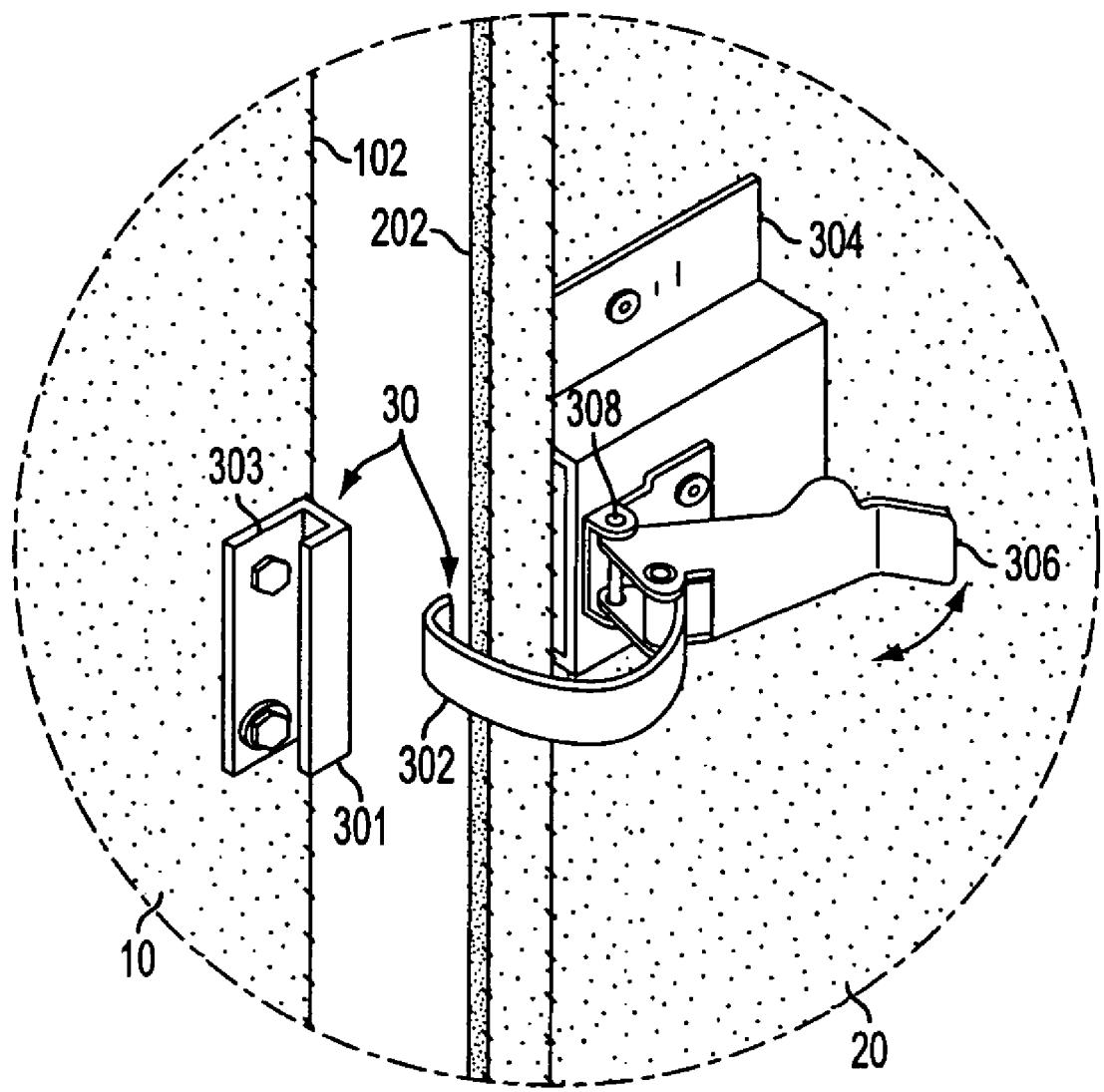
FIG. 3 is an enlarged isolated view of a releasable latch interconnection made between abutting lateral ends of a filter section and a fan section according to an embodiment of the invention.

Referring now to FIG. 3, a quickly-releasable, mechanical interconnecting system or mechanism 30 can be used as the releasably attachable interconnection and seal system used in the filter unit 100 that not only mechanically interconnects and joins adjoining lateral ends 102, 202 of the filter section 10 and fan section 20, but that also creates a force that tends to push and/or pull one lateral end of a filter or fan section in the against the abutting lateral end of the other section to enhance the air seal.

As an example of such a releasably attachable interconnection mechanism, fast action positive pressure latches can be used in one preferred embodiment that permit the filter unit to be disconnected and then reconfigured to adapt to multiple unit applications for positive and negative pressure applications. Several of these section interconnection mechanisms can be used to make the interconnection of the fan and filter sections, such as by fixing the interconnection mechanisms in a generally uniformly spaced relationship around the circumference of the lateral ends of the filter and fan sections. Suitable commercial brands of positive pressure latches that can be adapted for use in the present invention in this regard includes is, for example, a quick release pressure door latch. FIG. 3 illustrates an exemplary non-limiting latch connection made between two abutting lateral ends of a filter section 10 and a fan section 20 using a latch mechanism 30 of this type. This non-limiting example of releasable latch includes a stationary hook 301 including a base 303 screwed, riveted, welded or otherwise fixedly mounted to filter section 10, and a pivotal hook 302 mounted on fan section 20 via a rivet, screw, or similar connection means at its base 304 and includes a pivotal lever 306 that can be manually operated to hook the pivotal hook 302 around stationary hook 301 and then be pressed down in an opposite direction as indicated by the double arrow in FIG. 3 by rotation of the lever around another pivot 308. As will be appreciated, in an alternative arrangement the stationary hook 301 can be mounted on the fan section 20 and the pivotal hook 302 and hand lever can be mounted on the filter section 10.

Suitable latch mechanisms can be applied or readily adapted for use in the invention, such as hook-to-hook latches (e.g., akin to latches used on tote cases and suitcases, and the like), latches with sliding release means, latches with lever-actuated sliding catches, and so forth. The perimeter of the lateral ends the filter section and fan section also can be configured to create complimentary edges that will physically interfit to also provide some physical overlapping contact between the mating lateral ends of the two different filter sections. For example, the filter section could have the circumferential outer surfaces at the edges of each lateral end of the section have a recessed or beveled edge surface or indentation at the edges, while fan section could be assembled or machined such that it has extensions protruding axially away from the edges of each of its lateral ends which extensions are shaped to interfit snugly and flush with the recessed edge surface on the filter section, or vice versa.

The air seal made between fan section 20 and filter section 10 is not perfectly air tight when using the latches and comparable readily available, cost-effective and relatively good air tight sealing mechanisms. For most applications, it would not be cost-effective to install fasteners on the ends of the sections that provide a perfect air seal. In the present invention, cost-effective latches are implemented that provide high quality air seals, but to the extent some minor leakage may occur, the configuration of the filter and fan sections can be arranged to reduce the threat of leakage of contaminated air through the seal to acceptable levels.

Figure 4:
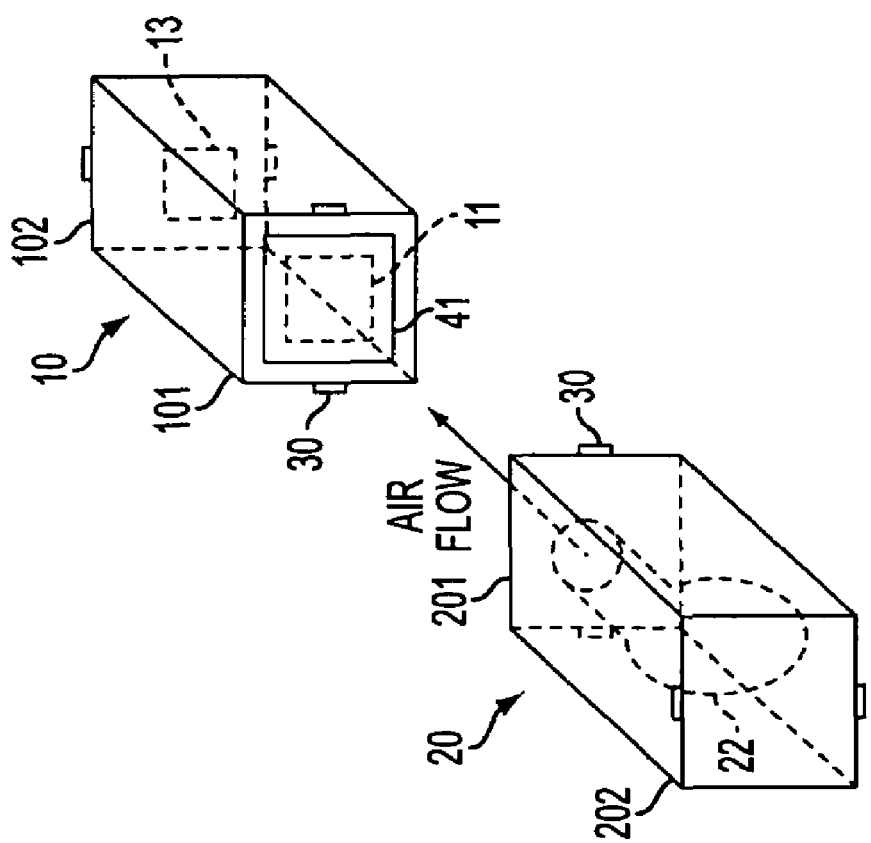
FIG. 4 is a schematic view of a latching configuration for a blow through mode of operation of the filter unit.

A continuous sealing gasket 41, such as indicated in FIG. 4, also is introduced between the abutting ends of the two filter sections being mated to enhance the air seal when interconnected with the latches. For sake of convenience, the sealing gasket generally will be initially positioned on one of the end faces of the filter sections before the ends are interconnected. A shallow groove or track can be provided on the end face of one of the sections to retain the gasket. The shallow groove or track used in this respect will be appropriately sized to permit enough clearance for the retained sealing gasket when the gasket is placed under compression when two adjoining lateral ends of the filter and fan sections are interconnected.

The interconnection means compresses the filter and fan sections together against the continuous gasket on the perimeter that essentially but not necessarily absolutely eliminates air leakage between the two filter sections 10 and 20. The gasket can be a flat surfaced rubber ring or a rubber O-ring. Continuous neoprene gaskets can be used.

Figure 5:
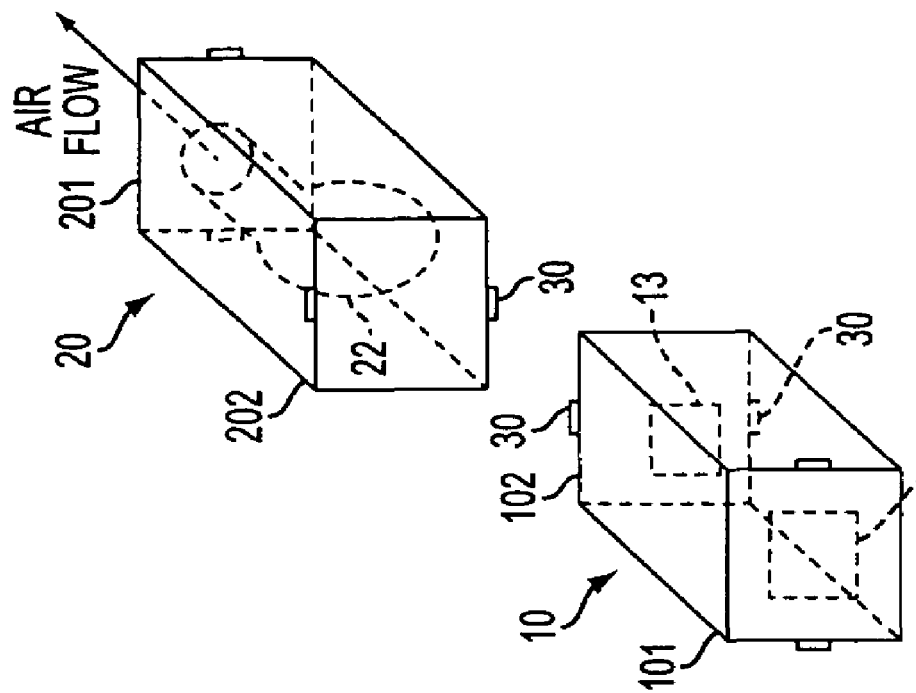
FIG. 5 is a schematic view of a latching configuration for a draw through mode of operation of the filter unit.

In the non-limiting embodiment illustrated in FIGS. 4 and 5, latch mechanisms 30 that are used to attachably/detachably interconnect the filter section 10 and fan section 20 at lateral ends thereof are selectively positioned and attached around the perimeters of the respective lateral ends of the filter and fan sections such that the latches on one of the sections will only align with corresponding catches on the other section such that air flow can only be properly directed through the prefilter side first of the filter section 10.

FIGS. 4 and 5 illustrate these arrangements for force through and pull through fan arrangements, respectively. This arrangement prevents a user from connecting the sections improperly relative to this requirement. As can be seen from these figures, the latches on one section and catches on the other section only align when the fan and filter sections are properly arranged to direct impinging air flow into prefilter of the fan section.

Alternatively, pegs and holes could be provided on opposing end faces of the respective filter section and fan section requiring alignment and interfitting of the pegs and holes before the sections can be mated in a given order that ensures the impinging air is directed first against the prefilter of the filter section.

In particular, and as will become more apparent from the detailed descriptions below, factors such as whether the filter unit is deployed inside or outside the enclosure to be protected or alternatively decontaminated, and whether the enclosure will have a positive or negative pressure environment relative to external airspace, require different arrangements in the blow-through versus draw-through configuration needed on the fan section relative to the filter section of a filter unit.

A first general scenario in which the filter unit of this invention can be effectively deployed is a contaminated outside environment scenario. This scenario can arise, for example, when a CBR attack or threat occurs outside an enclosure designated as a "safe room". For purposes herein, "outside" can mean outdoors or an indoor building air space outside the enclosure room located within the same structure.

Figure 6:
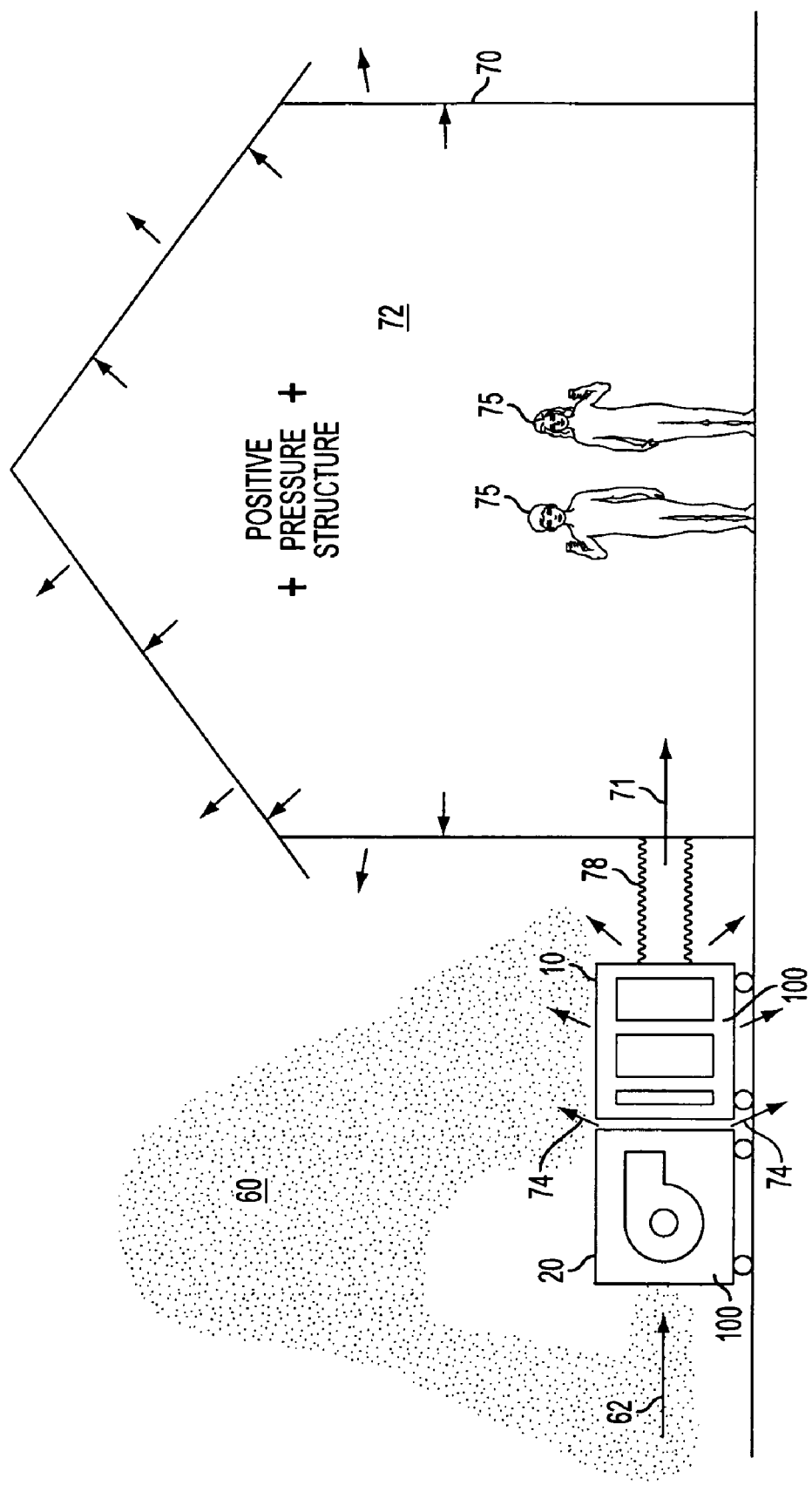
FIG. 6 is a schematic diagram of an arrangement according to this invention for using a filter unit such as described in FIG. 1 as positioned outside an enclosure (blow-through configuration outside a safe area according to an inventive configuration) providing a contaminate free positive pressure environment in order to protect occupants of the enclosure from an external CBR threat.

In the outside (external) contamination situation, the filter unit is operable to decontaminate contaminated air in an atmosphere located outside an enclosure, e.g., a "safe room", having an airspace to be protected. FIG. 6 is one exemplary implementation of the filter unit in this scenario according to an embodiment of the invention in which the filter unit is placed outside in the atmosphere in which the CBR attack has occurred, while FIG. 7, for sake of comparison, shows an incorrect implementation of a multi-sectioned filter unit in that scenario. The reconfigurability of the fan and filter sections of the filter unit of the present invention as described herein make it possible to avert the contamination problem shown in FIG. 7.

Figure 7:
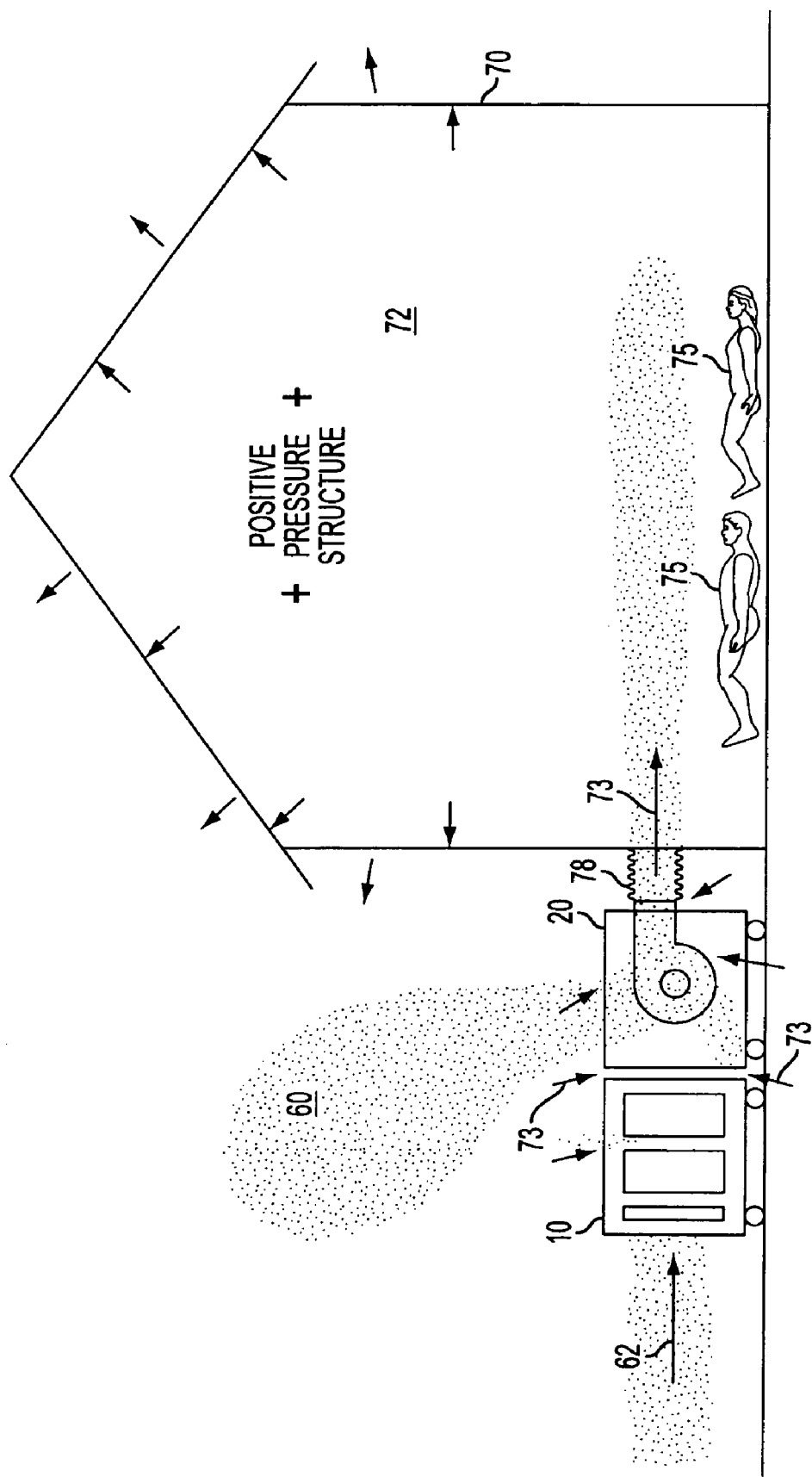
FIG. 7 is a schematic diagram of a comparison arrangement to FIG. 6 (draw-through configuration outside a safe area according to an unsafe comparison configuration).

Referring to FIG. 7 in more detail now, undesirable infiltration of contaminated air into the air to be discharged into the enclosure by the filter unit 100 is a risk if the fan section 20 were used to draw or pull air through the filter section 10 while the filter unit 100 is located in a contaminated airspace 60 outside the enclosure 70 that defines an airspace 72 to receive the filtered air. The actual or potential problem is that filtered air can become recontaminated while still inside the filter unit 100 before it is discharged by the filter unit 100 into the airspace 72 of the enclosure 70 that should be protected. Namely, contaminated air 73 can bypass the filter section 10 immediately prior to the fan inlet, which is under negative pressure.

As shown in FIG. 6, the present invention makes it possible to avert this problem by permitting the fan section 20 to be moved as necessary to the opposite end of the filter section 10 for interconnection with it to again form a single unitary device 100, which then is operable to instead force (blow) air drawn from the airspace outside the enclosure through the filter section 10. Any leakage 74 that might occur between the fan section 20 and filter section 10 before the air is introduced into the filter section 10, in this arrangement, would merely release some contaminated air back into already contaminated airspace 60, but not inside the enclosure 70 being protected by filter unit 100, and thus would pose no increased threat to the occupants 75 sheltering within the enclosure 70. The filter unit thereby feeds clean (noncontaminated) air 71 into the enclosure 70.

Figure 8:
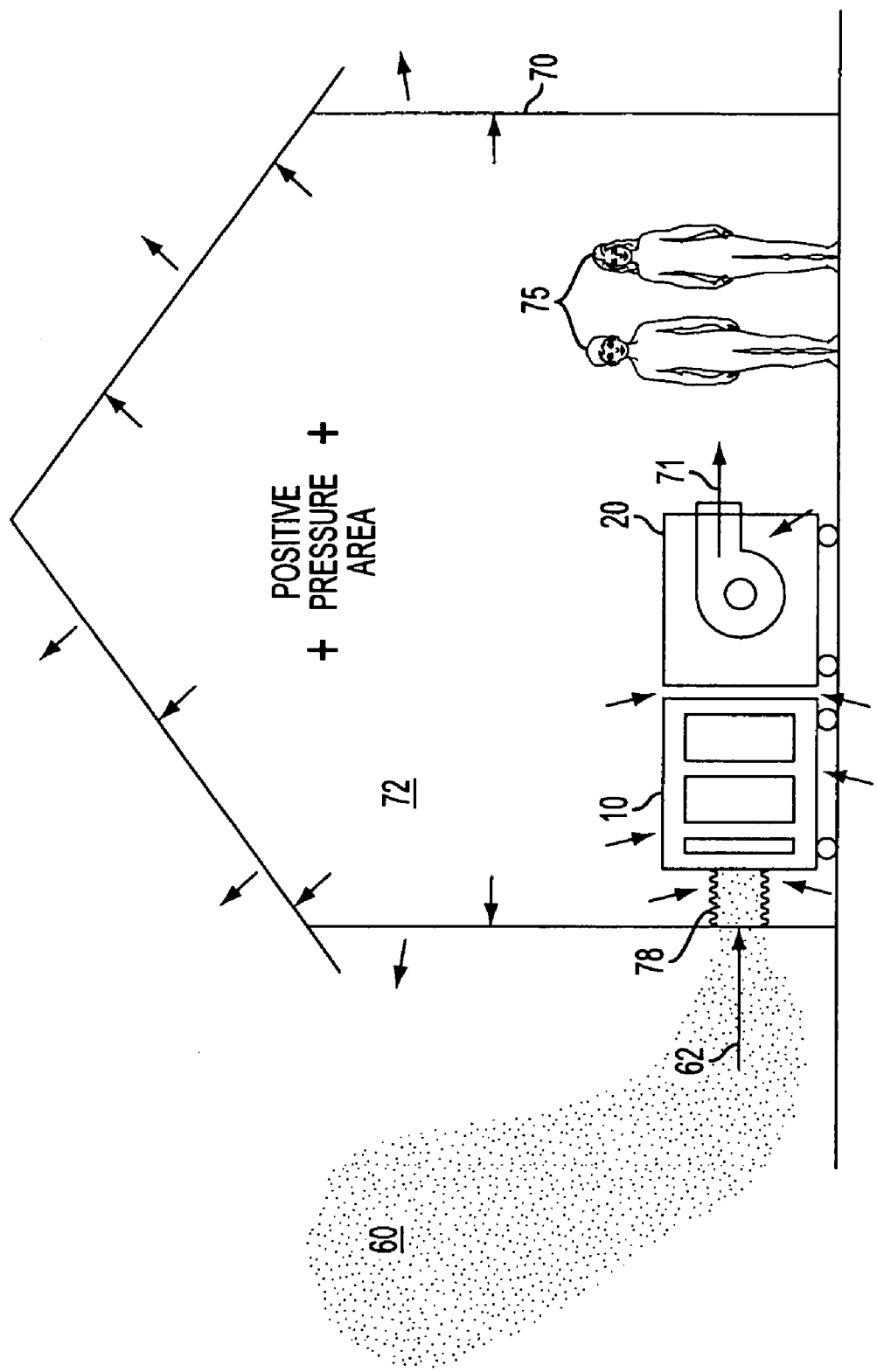
FIG. 8 is a schematic diagram of an arrangement according to this invention for using a filter unit such as described in FIG. 1 as positioned inside an enclosure (draw through configuration inside a safe area according to an inventive configuration) providing a contaminant free positive pressure environment in order to protect occupants of the enclosure from an external CBR threat.

Referring now to FIG. 8, if the filter unit 100 alternatively is located inside the enclosure 70 when the threat is contaminated air 60 outside the enclosure, the present invention makes it possible to interconnect the fan section 20 and filter section 10 in a sequence as shown such that the filter section 10 receives intake of contaminated air 60 drawn from the outside into the filter unit 100 while the fan section 20 is positioned and interconnected on the opposite end of the filter unit 10 operable to draw air through the filter section 10. Any infiltration of air into the filter unit that bypasses the filter section 10 and enters on the suction side of the fan section 20 would pose no threat in that configuration since the air leaked inside the enclosure 70 would be filtered air.

Figure 9:
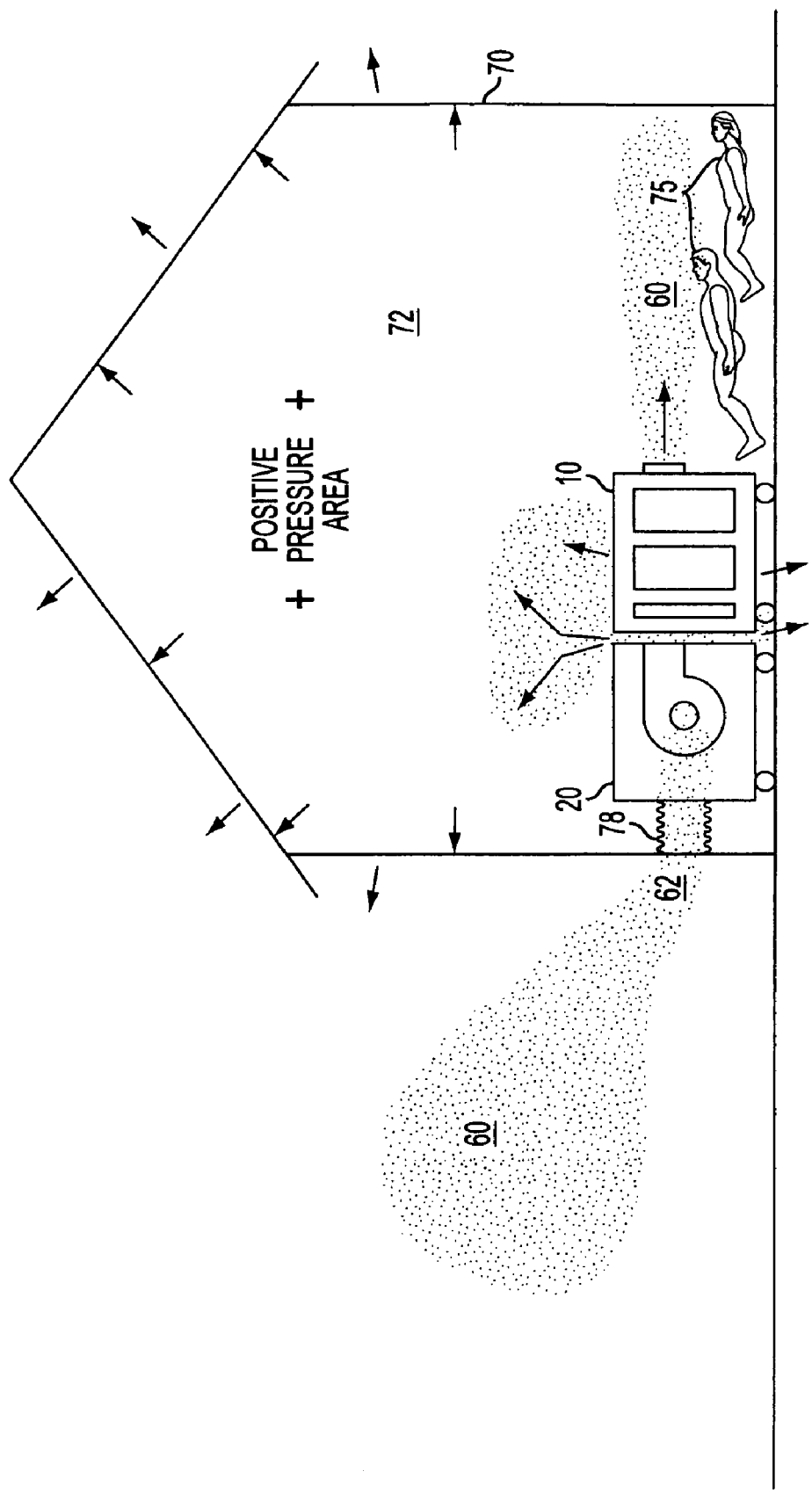
FIG. 9 is a schematic diagram of a comparison arrangement to FIG. 8 (blow-through configuration inside a safe area according to an unsafe comparison configuration).

By contrast, as shown in FIG. 9, if the fan section 20 of a filter unit 100 stationed inside the enclosure 70 is arranged to receive intake of the contaminated air 62 drawn from outside the enclosure 70 and the force it through the filter section 10, then contaminated air 60 can leak into the airspace 72 as the positive pressure between the discharge of the fan section 20 and the inlet of the filter section 10 can result in unfiltered contaminated air escaping into the "safe" area 72.

The enclosure 70 in the contaminated outside air scenario, in which the filter unit 100 is deployed either outside or inside the enclosure 70 being protected as indicated above, preferably defines a positive pressure environment to help exclude infiltration of contaminated outside air into the enclosure 70 through any incompletely sealed slits or openings in its partition walls other than the ductwork 78 used for introducing the filtered air from the filter unit 100. The filter unit 100 can be used in the contaminated outside air scenario to filter contaminated or potentially contaminated air before it is introduced into an enclosure or safe room in a military, commercial, public, medical, apartment, office, or residential building or structure. The filter unit can be used to create a positive pressure in a draw through mode for a sterile and clean room environment, and the like.

In another general scenario in which the filter unit of this invention can be effectively deployed is the contaminated enclosure scenario. In this situation, the filter unit is operable to decontaminate contaminated air in an atmosphere located within an enclosure. This situation can arise when the filter unit is needed to decontaminate air of an enclosure or room in which persons or equipment are contaminated with CBR's, or persons contagiously ill with air-transmitted diseases or viruses who are receiving medical attention or being isolated or quarantined and so forth. This scenario also would apply to a medical triage situation where contaminated or potentially contaminated patients posing a great risk to others are initially being admitted to a medical facility for initial screening, diagnosis and care. In addition, a one tent or room configuration can be placed under a negative pressure in a blow through configuration, such as for a decontamination ward or shower room.

Figure 10:
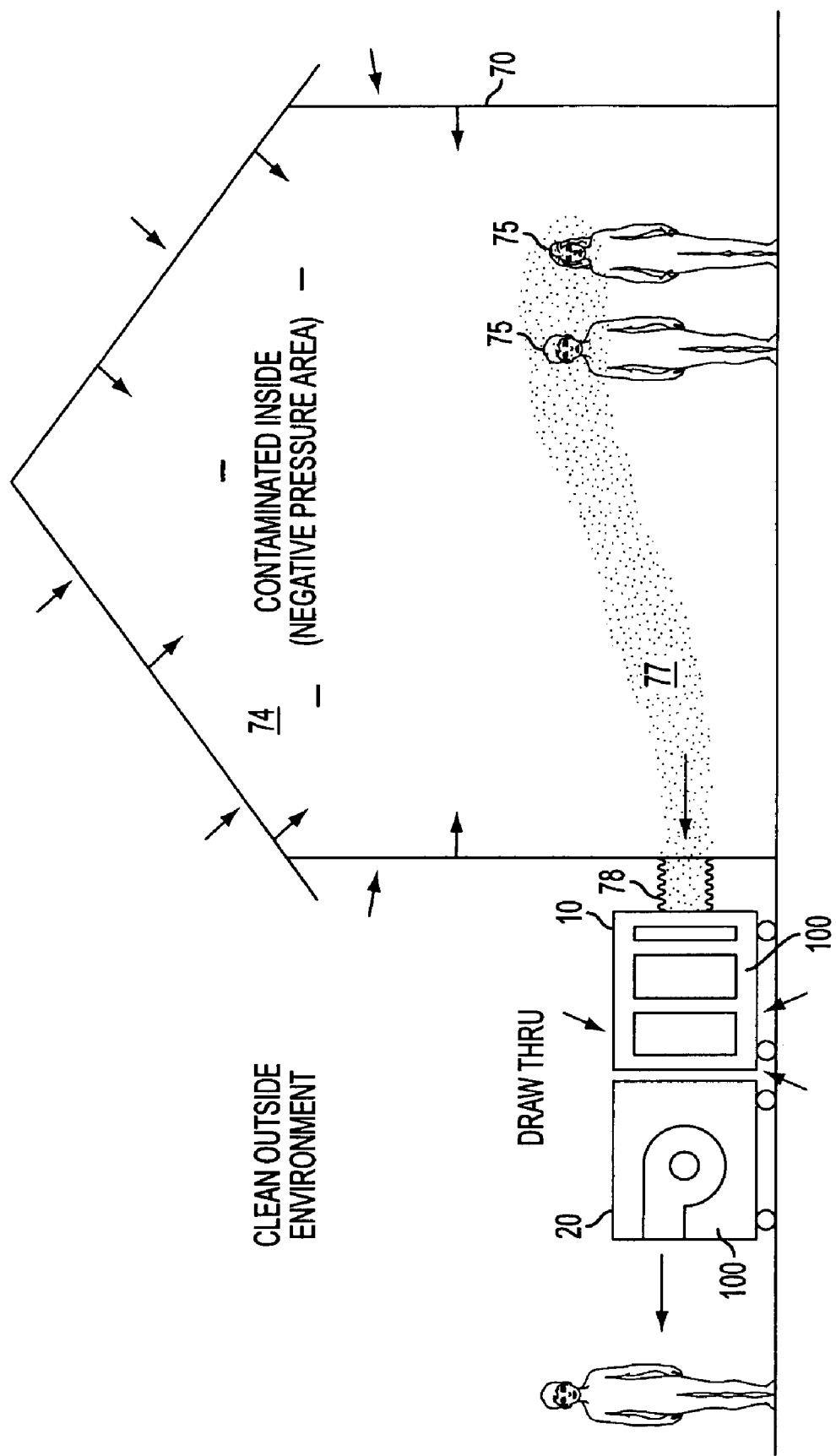
FIG. 10 is a schematic diagram of an arrangement according to this invention for using a filter unit such as described in FIG. 1 as positioned outside an enclosure (draw-through configuration outside a decontamination area according to an inventive configuration) having a contaminated negative pressure environment in order to reduce the contamination threat within the enclosure and to protect persons outside the enclosure from a contamination threat within the enclosure.
Figure 11:
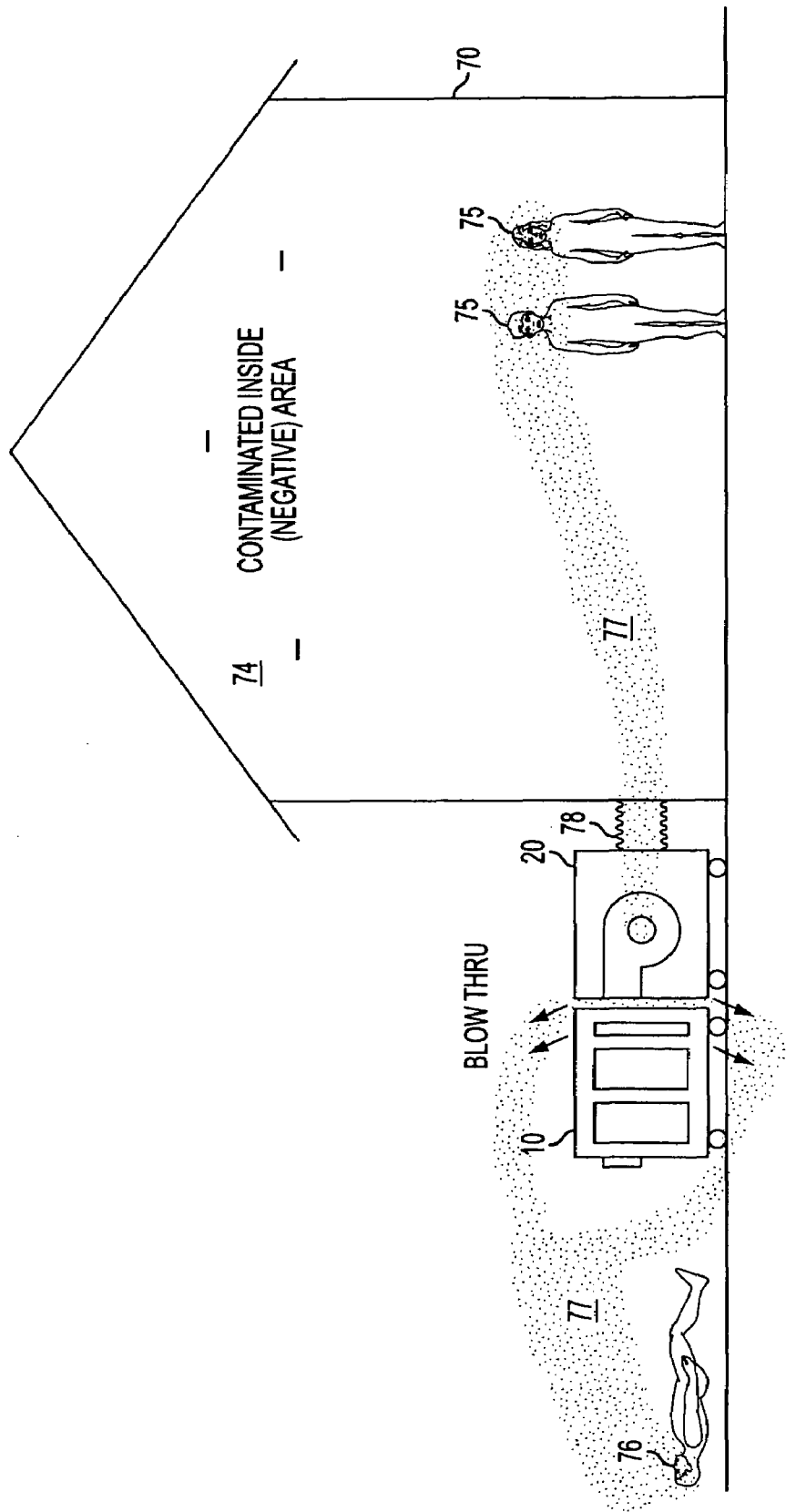
FIG. 11 is a schematic diagram of a comparison arrangement to FIG. 10 (blow-through configuration outside a decontamination area according to an unsafe comparison configuration).

Referring to FIG. 10, when the filter unit 100 is located outside the contaminated enclosure 70, the filter unit 100 should be assembled such that contaminated air 77 in airspace 74 inside the enclosure 70 should be drawn through the filter section 10 first before passing through the fan section 20. Any leakage that might occur from the filter unit 100 occurs after the decontamination of the air stream in the filter section 10, in that arrangement, which would leakage would pose no health threat to the surroundings of the enclosure 70. On the other hand, and as indicated in FIG. 11, if the fan section 20 instead was used to blow (force) contaminated air 77 from the contaminated airspace 74 inside enclosure 70 through the filter section 10, contaminated air 77 could leak out of the filter unit 100 into the surroundings before it reaches the filter section 10 where it would pose a health risk to persons 76 outside the enclosure.

Figure 12:
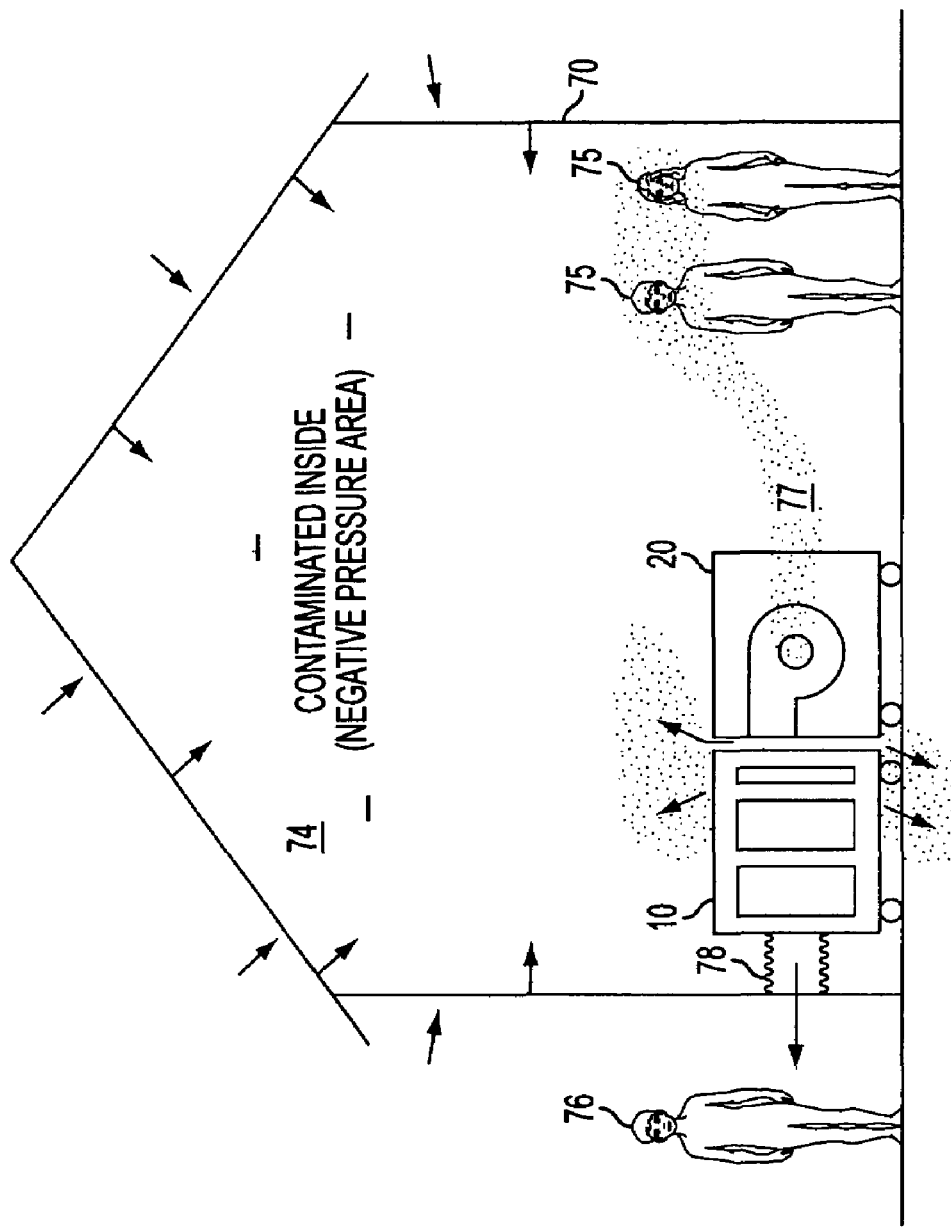
FIG. 12 is a schematic diagram of an arrangement according to this invention for using a filter unit such as described in FIG. 1 as positioned inside a contaminated enclosure (blow-through configuration inside a decontamination area according to an inventive configuration) having a negative pressure environment in order to reduce the contamination threat within the enclosure and to protect persons outside the enclosure from a contamination threat within the enclosure.
Figure 13:
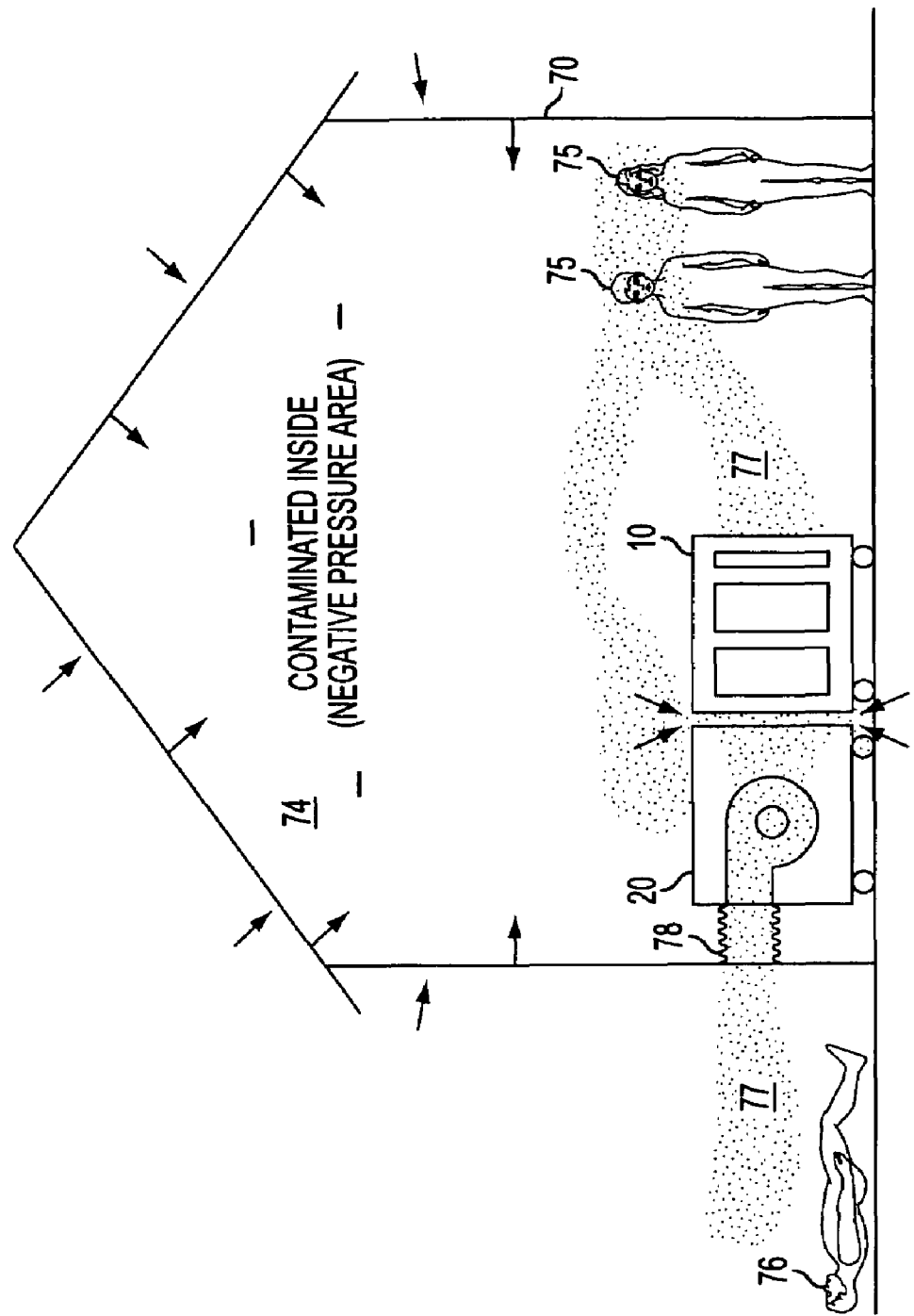
FIG. 13 is a schematic diagram of a comparison arrangement to FIG. 12 (draw-through configuration inside a decontamination area according to an unsafe comparison configuration).

Referring to FIG. 12, when the filter unit 100 is located inside the contaminated enclosure or room 70, the fan section needs 20 to be assembled with the filter section 10 so as to blow or force air into the filter section 10. Any leakage of the contaminated air 77 before it enters the filter section 10 merely ends up back in the airspace 74 of the contaminated room 70, and does not create a risk of contaminating the outside air. Referring to FIG. 13, on the other hand, if the fan section 20 is arranged to draw air through the filter section 10, that is undesirable because contaminated air 77 inside the enclosure 70 can bypass the filter section 10 on the suction side of the fan section 20 and end up getting released outside the enclosure 70 where it poses a health threat to persons 76 outside the enclosure.

The enclosure 70 in this contaminated enclosure scenario, in which the filter unit is deployed outside or inside the enclosure being isolated above as indicated above, preferably defines a negative pressure environment to help prevent leakage of contaminated air in the enclosure to the outside through any incompletely sealed slits or openings in its partition walls other than the ductwork 78 used for feeding air outside to or from the filter unit 100.

As such, the portable air filter unit 100 of this invention makes it possible to decontaminate air being fed to or present in an enclosure 70. For purposes herein, "positive pressure" means an air pressure above ambient atmospheric pressure, and "negative pressure" means an air pressure below ambient atmospheric pressure.

Damper control can be provided for the enclosure 70 which, by manual control of an occupant in or outside the "safe room" enclosure, or by automatic control, isolates the ductwork supporting air handling between the filter unit and the enclosure from the remainder of any ductwork that might be used for an HVAC system supporting that enclosure under normal conditions. A pressure gauge can be used to monitor the pressure condition within enclosure 70. In the automated control mode, for example, a CBR sensor or "sniffer" detector could be used in combination with a microprocessor and electromechanical means to activate and re-position HVAC dampers effective to isolate the safe room airspace from the rest of the building's HVAC system and only leave open the ductwork 78 fluidly connecting the filter unit 100 with the airspace 72 inside the enclosure (FIGS. 6, 10) or the outside air (FIGS. 8, 12). Alternatively, a CBR sensor could be used to raise an alarm to alert an occupant of the need to manually re-position or configure the HVAC system dampers effective to isolate the safe room air space such that its air is filtered exclusively by the filter unit.

Alternatively, the enclosure could be maintained as a full time or continuous isolation room in which the room's enclosure's air space is kept isolated from the rest of the air space within a building containing the enclosure at all times, and the filter unit is dedicated for usage to support the air filtering needs of the safe room. For example, this arrangement could be used to isolate hospital ward rooms or areas in which CBR-contaminated patients or patients being treated for highly dangerous diseases or conditions. Alternatively, it could be used to protect individuals having heightened concern about and/or heightened sensitivities or vulnerabilities to illness-causing organisms or substances. That is, the "safe room" or "isolation room", in these embodiments, receive no air handling support by the structure's general H.V.A.C. system used to support the rest of other significant air space within the same building, and only receives air handling support from the filter unit when it is activated as an intermittent or isolated event mode of operation of the filtering system.

Examples of chemical warfare agents that the filter unit and methods of its use according to the present invention can be used to protect the airspace of an enclosure against include, but are not limited to, nerve agents, blister agents, blood and choking agents, and so forth.

Nerve agents include Sam (GB, 107-44-8), cyclosarin (GF), VX (50782-69-9), and Tabun (GA, 77-81-6). These nerve agents are chemically similar to organophosphate pesticides, but are up to a thousand times more potent. GB has an $LCt_{50}$ (vapor) of 70 mg min/m$^3$. While relatively more toxic than GB, VX also has a much lower volatility and thus poses less of an airborne threat to occupants of buildings and other enclosures receiving conventionally filtered air. The Airborne Exposure Limit for the nerve agents GB, VX, GA or GD, as recommended by the Surgeon General's Working Group, U.S. Dept. of Health & Human Services, is 0.003 $\mu$g/cm$^3$.

As generally known, these nerve agents, such as sarin, disrupt normal functionality at the synapses between nerve cell pairs, such that targeted nerve cells continue to be stimulated long after the original impulse is transmitted. This causes uncontrollable and repetitive contractions in muscles and secretions of glands controlled by the targeted nerve cells. As also generally known, treatment of a person who has already been exposed to one of these nerve agents and is experiencing convulsions requires immediate access to the antidote atropine to halt the uncontrolled stimulating action occurring at the exposed nerve cells, and also administration of praxidoxime chloride (2-PAM) to restore normal nerve transmission. These drugs are highly regulated, controlled substances, and are not always readily available, especially if the attack occurs in a civilian locale. Consequently, a highly desirable practical defense against a nerve agent attack is avoidance of exposure to begin with. As it generally will not be practical to have gas mask handy at all times, especially in "non-combat" settings, an ideal solution, if feasible, is taking shelter in an isolated enclosure ventilated by an air handling system having CBR filtering capability. The filter unit of the present invention is useable to make that function and capability attainable.

The filter unit of the present invention also offers protection against blood agents, such as cyanogen chloride (CK), arsine (SA), hydrogen chloride (AC), or hydrocyanic acid (HCN). Blood agents produce their effects by impairing cellular oxygen use. Inhalation is the usual entry route. In high concentrations, the amount of CK or AC inhaled in even a few breaths may be enough to cause rapid death, while even exposure to lower concentrations for a sufficient duration of time can lead to permanent injuries or death. The present invention also protects against choking agents such as phosgene, chlorine, and so forth. CK also has a choking effect.

The filter unit of the present invention also can be used to protect against blister agents, or "vesicants," which include mustard agents, such as nitrogen mustards (HN-1, HN-2, HN-3), sulfur mustards (H, HD, HT), and mustard-lewisite (HL). Mustard agents pose both a vapor and liquid threat. Mustard agents can pose more of a threat to occupants of an enclosure receiving conventionally filtered air when the air temperature exceeds their boiling point of about 50° F.

The filter unit of the present invention offers protection against the above chemical threat agents, and also airborne toxic industrial chemicals such as organic vapors (e.g., cyclohexane), base gases (e.g., ammonia), acid gases (e.g., cyanogen chloride, hydrogen sulfide), and other dangerous agents (e.g., formaldehyde).

The present invention also provides protection against airborne biological agent threats, such as bacterial, viral or pathogenic agents. These airborne biological threats can include, for example, anthrax, botullinum, gas gangrene, aflatoxin, plague, smallpox, Ebola, tularemia, ricin, rotaviruses, and hemorrhagic viruses.

The present invention additionally provides protection against airborne radiological agent threats such as alpha, beta and gamma radiation.

While the invention has been disclosed in preferred forms, those skilled in the art will recognize that many modifications, additions, and deletions can be made therein without departing from the spirit and scope of the invention as set forth in the following claims.

What is claimed is:

1. A portable filter unit, comprising:
a fan section mounted on a movable first cart, wherein the fan section comprises first and second opposite lateral ends, and wherein the fan section includes a fan and a motor operable for driving the fan to cause air to flow into the first lateral end or second lateral end and exit through the opposite first lateral end or second lateral end thereof;
a filter section mounted on a second movable cart, wherein the filter section comprises third and fourth opposite lateral ends, and wherein the filter section includes a macroscopic dust prefilter, a HEPA filter, and a gas adsorbent filter, and the filter section is adapted to allow air to flow into the third lateral end or fourth lateral end and through the prefilter, HEPA filter, gas adsorbent filter, in that sequence, and opposite third lateral end or fourth lateral end thereof;
wherein the fan section and filter section are adapted for making a releasably attachable interconnection of either of the opposite lateral ends of the fan section in abutting relationship with either of the opposite lateral ends of the filter section, and wherein airflow is caused to pass through the fan section and filter section when the motor drives the fan.

2. The portable filter unit of claim 1, wherein the interconnection comprising a releasable mechanical fastener.

3. The portable filter unit of claim 1, wherein the interconnection comprising a positive pressure latch.

4. The portable filter unit of claim 1, wherein the interconnection comprises two or more releasable mechanical fasteners positioned at respective locations around a circumference of the respective lateral ends of the filter and fan sections.

5. The portable filter unit of claim 1, wherein the interconnection further comprising a continuous air-excluding gasket positioned between the abutting respective lateral ends of the filter and fan sections.

6. The portable filter unit of claim 4, wherein the releasable mechanical fasteners are positioned at respective locations around the circumference of the respective lateral ends of the filter section and fan section in a configuration limiting interconnections between the filter section and fan section to interconnections operable to cause air flow to be directed through the prefilter of the filter section before the HEPA filter and the gas adsorbent filter when the motor drives the fan.

7. The portable filter unit of claim 6, wherein the fan in the fan section is operable to blow air from the fan section into and through the filter section, when the motor drives the fan.

8. The portable filter unit of claim 1, wherein the first and second carts each are equipped with cart rolling means.

9. The portable filter unit of claim 1, wherein the fan is selected from the group consisting of a centrifugal fan and a wheel plenum fan.

10. The portable filter unit of claim 1, wherein the filter section adapted to remove chemical, biological, and/or nuclear (CBR) materials from an airflow conducted through the filter unit.

11. The portable filter unit of claim 1, wherein the gas adsorbent filter comprises a mesh filter medium containing activated carbon impregnated with copper-silver-zinc-molybdenum-triethylenediamine.

12. A method for filtering contaminants from air, comprising:
a) making a fluid connection between a first airspace located inside an enclosure and a second airspace located outside the enclosure;
b) positioning a filter unit in the first airspace or in the second airspace, the filter unit, which is fluidly connected to the fluid connection, comprising:
a fan section mounted on a movable first cart, wherein the fan section comprises first and second opposite lateral ends, and wherein the fan section includes a fan and a motor operable for driving the fan to cause air to flow into the first lateral end or second lateral end and exit through the opposite first lateral end or second lateral end thereof;
a filter section mounted on a second movable cart, wherein the filter section comprises third and fourth opposite lateral ends, and wherein the filter section includes a macroscopic dust prefilter, a HEPA filter, a a gas adsorbent filter; and
wherein the fan section and filter section are adapted for making a releasably attachable interconnection of either of the opposite lateral ends of the fan section in abutting relationship with either of the opposite lateral ends of the filter section;
c) operating the motor to drive the fan in the fan section effective to move a contaminated air stream drawn from either of the first airspace or the second airspace through the filter section effective to remove contaminants from the air stream;
d) discharging the resulting decontaminated air stream from the filter unit into the other airspace.

13. The method according to claim 12, wherein step d) is performed without recontamination of the air stream with contaminants occurring after the air stream exits the filter section.

14. The method as claimed in claim 13, wherein the first airspace comprises a positive air pressure environment.

15. The method as claimed in claim 14, wherein the filter unit being positioned in the second airspace, and the fan section interconnected with the filter section in a manner effective to blow the air stream as drawn from contaminated air in the second airspace into and through the filter section after the air stream passes through the fan section.

16. The method as claimed in claim 14, wherein the filter unit being positioned in the first airspace, and the fan section interconnected with the filter section in a manner effective to pull the air stream as drawn from contaminated air in the second airspace through the filter section before the air stream passes through the fan section.

17. The method as claimed in claim 13, wherein the first airspace comprises a negative air pressure environment.

18. The method as claimed in claim 17, wherein the filter unit being positioned in the second airspace, and the fan section interconnected with the filter section in a manner effective to pull the air stream as drawn from contaminated air in the first airspace through the filter section before the air stream passes through the fan section.

19. The method as claimed in claim 17, wherein the filter unit being positioned in the first airspace, and the fan section interconnected with the filter section in a manner effective to blow the air stream as drawn from contaminated air in the first airspace into and through the filter section after the air stream passes through the fan section.

20. The method as claimed in claim 12, wherein the filter section includes a macroscopic dust prefilter, a HEPA filter, and a gas adsorbent filter.

21. The method as claimed in claim 12, further comprising positioning a plurality of releasable mechanical fasteners at the respective lateral ends of the filter section and fan section in a configuration limiting interconnections between the filter section and fan section to provide interconnections operable to cause air flow to be directed through the prefilter of the filter section before the HEPA filter and the gas adsorbent filter when the motor drives the fan.

22. The method as claimed in claim 12, wherein the contaminants comprise at least one of a chemical gas and a radiological gas.

23. The method as claimed in claim 12, further comprising drawing the contaminated air stream from either the first or second airspace while occupied by at least one person.

* * * * *